United States Patent [19]

Jabbari et al.

[11] Patent Number: 5,365,389
[45] Date of Patent: Nov. 15, 1994

[54] CRASH STOP AND MAGNETIC LATCH FOR OPTIMUM USE OF DISC SPACE

[75] Inventors: Iraj Jabbari, Santa Clara County; Shahriar A. Tafreshi, Santa Cruz County, both of Calif.

[73] Assignee: Seagate Technology, Inc., Scotts Valley, Calif.

[21] Appl. No.: 893,764

[22] Filed: Jun. 5, 1992

Related U.S. Application Data

[63] Continuation-in-part of Ser. No. 611,412, Nov. 9, 1990, Pat. No. 5,187,627.

[51] Int. Cl.$^5$ .............................................. G11B 5/54
[52] U.S. Cl. .............................................. 360/105
[58] Field of Search ....................... 360/105, 106, 97.01

[56] References Cited

U.S. PATENT DOCUMENTS

| | | | |
|---|---|---|---|
| 4,947,274 | 8/1990 | Casey | 360/105 |
| 5,012,371 | 4/1991 | Pollard et al. | 360/105 |
| 5,134,608 | 7/1992 | Strickler | 360/105 X |

*Primary Examiner*—A. J. Heinz
*Attorney, Agent, or Firm*—Flehr, Hohbach, Test, Albritton & Herbert

[57] ABSTRACT

A limit stop is provided in a disc storage system having a rotary actuator mounted for travel about an axis adjacent to a rotating disc, and having an arm supporting a transducer over the surface of said disc and a motor element support extending opposite to said arm from said rotary support axis. A limit stop to limit the extent of movement of the motor element support is mounted on the base of the housing. The limit stop comprises a fixed portion mounted to the housing base, and extended portion mounted to define the limit of travel of the motor element support, said extended portion being connected to the fixed portion by a thin connecting portion which flexes under impact by the motor element. The fixed mounting portion, thin connecting portion, and extended portion form essentially a U-shaped element having a defined gap across the base of the "U", the gap defining the amount of flexibility in the limit stop, the flexibility being adapted to allow for absorption of the energy of the moving actuator arm, while causing the arm to rest against the surface of the limit stop with the transducer resting on the surface of the disc.

14 Claims, 4 Drawing Sheets

CRASH STOP AND MAGNETIC LATCH FOR OPTIMUM USE OF DISC SPACE

CROSS-REFERENCE TO RELATED APPLICATIONS

The present application is a continuation-in-part of U.S. Application Ser. No. 07/611,412, filed Nov. 9, 1990, and now U.S. Pat. No. 5,187,627 incorporated herein by reference.

FIELD OF THE INVENTION

The present invention is generally directed to disc storage systems, and more particularly to a limit stop assembly for preventing an actuator carriage from moving beyond predetermined stop positions in either direction of motion.

BACKGROUND OF THE INVENTION

In a hard or floppy disc drive system, a read/write head or transducer is moved across a data storage track so as to be positioned over a selected one of the large number of substantially circular, concentric tracks on which data is recorded and/or reproduced. The transducer is mounted on an actuator so as to be positioned in response to control signals transmitted to the actuator. The actuator carriage used in conjunction with this invention typically moves in rotary fashion to move the transducer radially across the disc surface from the innermost track to the outermost track.

In most hard disc drive systems, a plurality of discs are stacked on a spindle, and a corresponding plurality of magnetic heads are used to read and/or write data on each of the surfaces of the discs. The magnetic heads fly over the surface of the discs on an air cushion generated by the rapid rotation of the discs themselves. When power is turned off, the disc slowly spins down to a stop, and the actuator carriage is driven or mechanically biased to move the magnetic heads to an information-free parking or landing zone on which they may rest without destroying information, which is recorded only in other areas of the discs. Typically, the actuator carriage brings the heads quickly to the parking zone in the case of error or a loss of power, and generally a crash stop is provided to prevent further movement of the actuator carriage once it reaches its stop position. The crash stop is conventionally in the form of a pin which may or may not be preloaded.

Given the relatively small sizes of disc drives, for example to read and write on a 2.5 and 1.8-inch disc drive, it is a significant part of the design of the disc drive to precisely position the actuator carriage at the stop position to minimize the area of information-free parking zone. This zone is essentially wasted disc surface space, since no information can be recorded thereon. This parking zone is normally located inside the innermost data recording track on the disc. Another positioning consideration is that a crash stop must be located at the opposite end of the path of travel of the rotary actuator. As the actuator seeks from track to track, it accelerates and decelerates very quickly. It would be extremely damaging to the transducer heads for the transducer to be inadvertently moved off the edge of the surface of the disc.

A further problem with prior art forms of crash stops is that they have relied on a rubber pad or rubber coating to cushion the impact of the actuator arm upon the crash stop. However, rubber causes stiction which can hold the arm after impact, such that the voice coil motor cannot recover the arm's mobility. This is a major problem in miniature disc drives having voice coil motors (VCM's) with reduced torque.

Once the actuator carriage has been moved to its rest position abutting the crash stop, with the transducer now located over the parking zone on the disc surface, it is frequently desirable to latch the actuator carriage or hold it in place, for example, when the disc drive is being moved, so that the heads will not move from the parking zone. This is important because the heads are essentially resting on the surface of the disc in the parking zone, and could be damaged if caused to slide across the surface of the disc. The latch itself has to fit and function within the strict design tolerances of the disc drive system. It is it undesirable to use a solenoid to actively hold the actuator, since this would require a constant current, and therefore a constant drain on a battery or other power source. The design must also take into account the fact that the actuator carriage is heavy relative to the latch, and will therefore exert some force on the latch when the disc drive is tilted or shaken during movement.

SUMMARY OF THE INVENTION

It is an object of the present invention to provide a disc drive storage system which avoids the above-described difficulties of the prior art.

It is another object of the invention to provide a limit stop for a disc drive actuator in which the stopping forces applied to the actuator are not absorbed within the actuator itself.

it is still another object of this invention to provide a rotary disc storage system and limit stop apparatus co-operating therewith which stops the actuator carriage at a precisely set position, thereby positioning the transducers precisely relative to the disc landing zone.

In accordance with an aspect of the present invention, a limit stop is provided in a disc storage system having a rotary actuator mounted for travel about an axis adjacent to a rotating disc, and having an arm supporting a transducer over the surface of said disc and a motor element support extending opposite to said arm from said rotary support axis. A limit stop to limit the extent of movement of the motor element support is mounted on the base of the housing. The limit stop comprises a fixed portion mounted to the housing base, and a cantilevered portion mounted to define the limit of travel of the motor element support, said extended portion being connected to the fixed portion by a thin connecting throat which flexes under impact by the motor element. The fixed mounting base, thin connecting throat, and extended cantilevered element form essentially a U-shaped element having a defined gap across the base of the "U", the gap defining the amount of flexibility in the limit stop, the flexibility being adapted to allow for absorption of the energy of the moving actuator arm, while causing the arm to rest against the surface of the limit stop with the transducer resting on the surface of the disc.

In accordance with a further aspect of the invention, a second limit stop is mounted at the opposite end of the path of travel of the motor element of the rotary actuator, whereby the actuator arm is prevented from moving so far as to allow the transducer heads to travel beyond the surface of the disc.

In a further aspect of the present invention, the limit stop may be adapted to be a magnetic latch by defining an aperture within the extended, cantilevered portion and incorporating a magnet within the extended portion which is shielded from direct contact with the motor element support by the plastic of the extended portion, so that when the motor element strikes the limit stop it is captured and held against the limit stop by the force of the magnet.

These objects and features of the present invention will become more apparent from the following detailed description of a preferred embodiment thereof given in connection with the accompanying drawings.

DETAILED DESCRIPTION OF THE PREFERRED EMBODIMENT

Figure 1:
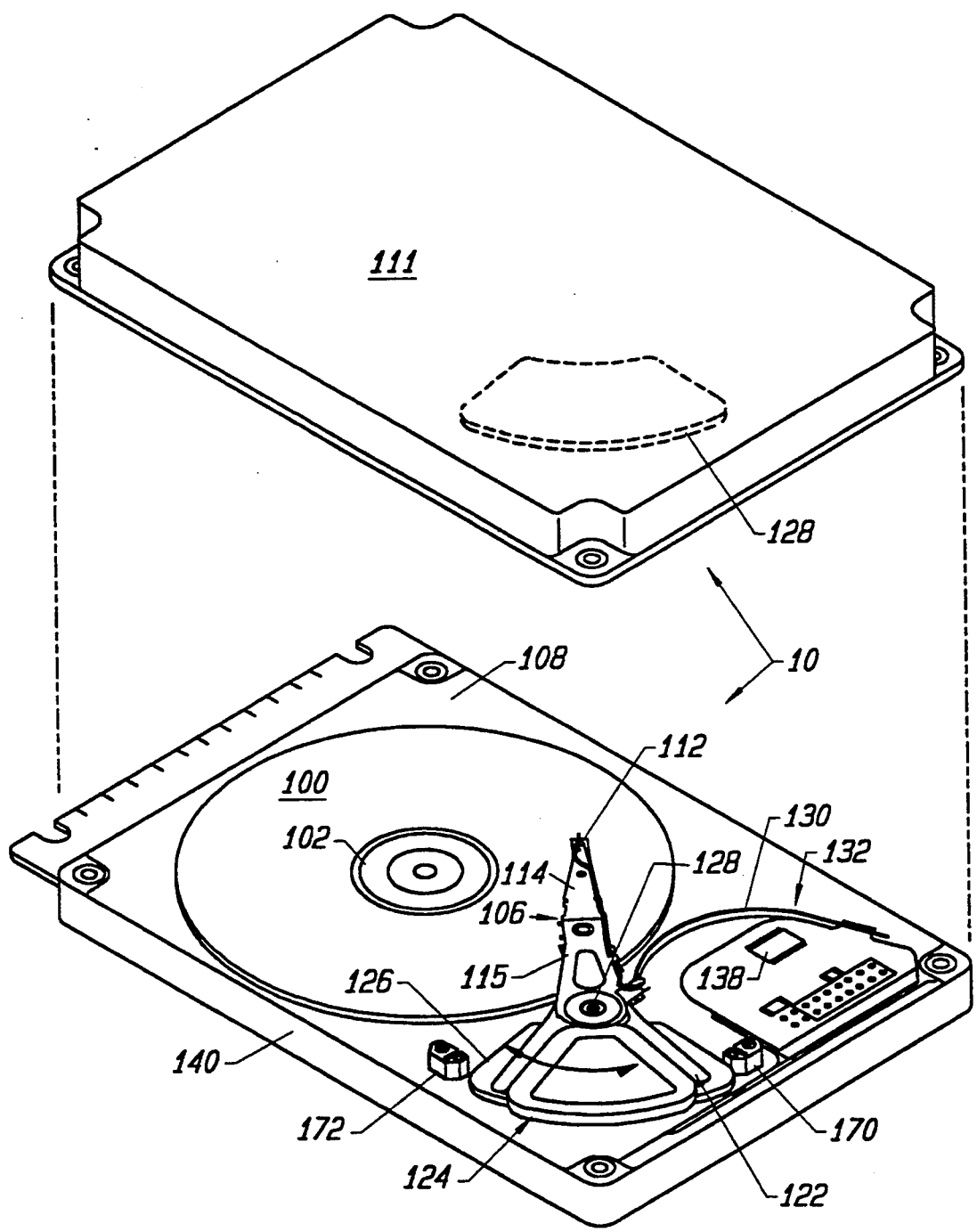
FIG. 1 is a plan view of the disc drive of the present invention generally illustrating the relative placement of the disc, actuator, and limit stops of this invention.

Referring now to the drawings and initially to FIG. 1 thereof, the present invention will be described in the context of a hard disc drive incorporating a rotary head actuator carriage. The invention will be described both relative to its use as a limit stop without incorporating any magnet, and as modified to incorporate a magnet to function as a magnetic latch.

As shown in FIG. 1, the hard disc system 10 has an outer envelope comprising upper cover 111 and base casting 108 in which the discs 100 are located; means for rotating the hard disc 100 are incorporated within or located beneath the base housing casting 108. The disc or discs are held in place on the hub of the spindle motor which comprises the rotating means by a clamp 102. The data on the circumferential tracks (not shown) of the rotating disc 100 is accessed using actuator 106 which is mounted for rotation about a fixed axis 128, typically supported from the base casting. The actuator 106 includes an arm portion 115, supporting flexure 114, which in turn supports a transducer 112. The opposite portion of the actuator arm from the pivot 128 comprises a fork 122 supporting coil 124. A first magnet 126 is typically supported on the base casting and glued to a pole piece not shown, a second pole piece 128 is provided which, in this example, is supported from the cover portion 111 of the housing. The magnet cooperates with the coil 124 to selectively cause the actuator 106 to move the transducer 112 from track to track. Control signals to cause this selective movement are received over cable 130 from control interface 132.

In response to the control signals received over cable 130, the actuator carriage 106 is pivotable about the support axis 128 in either clockwise or counterclockwise directions as shown by double-headed arrow "X". As the actuator moves, the transducer 112 is moved from an outermost data track T2 to an innermost data track T1. Actuator motor 140 is advantageously driven in response to an error condition or the termination of power to disc drive system 10 to move the actuator carriage 126 to an extreme or stop position so that the transducer 112 is positioned at either the inner or outer circumference of the disc 100 over an information-free landing or parking zone where no data is recorded. This zone is typically either outside of the outermost data track T2, or inside of the innermost data track T1. In the illustrated embodiment, the parking zone 150 is located at the inner circumference of the disc 100.

As is conventional in hard disc drive systems, the transducers 112 normally fly over the surface of the discs on an air cushion created by the rapid rotation of the disc when the spindle motor located beneath the disc is operative. The transducer comes to rest on the surface of the disc, typically in the landing zone 150, when the disc drive system is powered down either through the intentional termination of power or in response to a detected error condition. The parking zone 150 is defined to provide an area on which the heads or transducers 112 may safely rest without damaging any information recording area. However, the existence of this zone inherently reduces the area on which the surface of the disc on which data may be recorded, and so it is advantageous to minimize the area of the parking zone 150 by stopping the transducer within this zone as precisely as possible.

Although a braking circuit may be provided to bring the carriage to rest with the transducer 112 over the parking zone 150 in response to error or power termination conditions, it may happen that other conditions prevent the accurate functioning of the breaking circuit or cause the actuator to overshoot either the innermost or outermost data track of the disc. Therefore, a mechanical crash stop is provided for physically preventing the pivoting of the carriage 126 beyond its targeted stopping position in order to protect the transducer 112 from either contacting the support spindle for the discs or overshooting the outer edge of the disc. These crash stops, designated 170 for the crash stop which stops the heads adjacent the landing zone at the inner circumference of the track and 172 for the stop, which prevents the actuator from overshooting the outer edge of the disc, are positioned adjacent the edge of the base housing and supported from that housing in a manner which will be disclosed in detail with reference to the following figures. It can be seen that the stops are positioned to contact the edges of the coil supporting fork 122 of the rear extending portion of the actuator arm. This coil supporting fork 122 is a sturdy portion of the actuator arm, and may in fact be tailored in design to cooperate with the crash stop of the present invention.

Figure 2A:
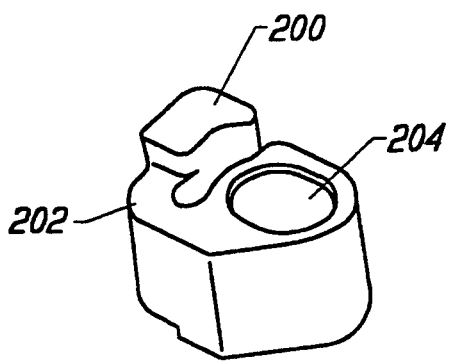
FIGS. 2A and 2B are a perspective view and top plan view of the limit stop of the present invention.
Figure 2B:
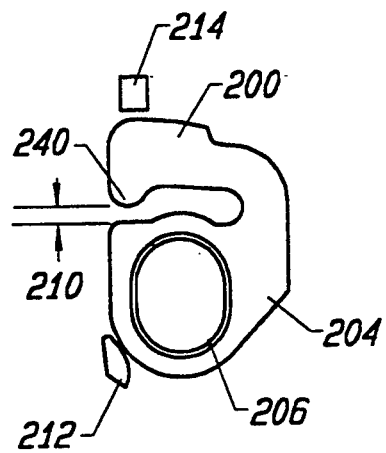
Figure 2D:
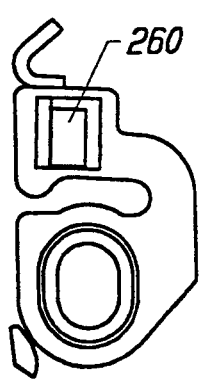
FIG. 2D is a top plan view of the device of FIG. 2C.
Figure 2C:
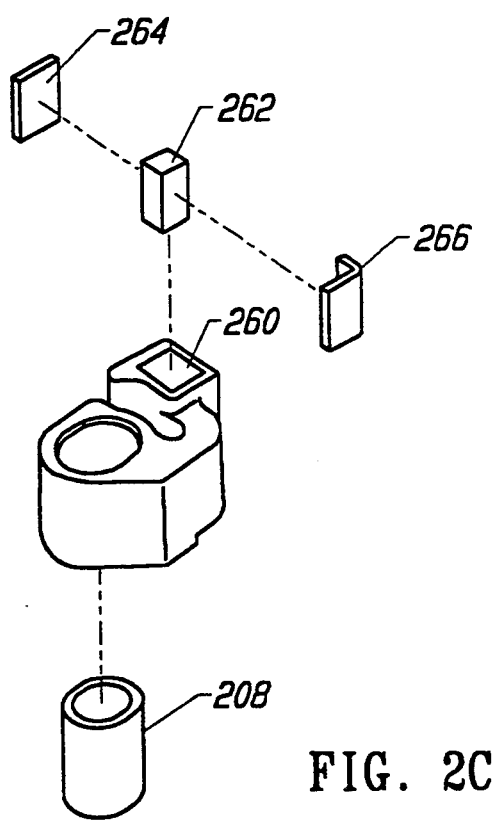
FIG. 2C is an exploded view of the limit stop adapted to incorporate a magnetic latch.

The structure of the crash stop for the miniature disc drive of the present invention is shown in FIGS. 2A, 2B, which is a top plan view of the crash stop, FIG. 2C which is an exploded view, and 2D which is an assembled view of the crash stop used both as a crash stop alone and as modified to form a magnetic latch. This will be discussed in relation to FIG. 3 which shows the rear portion of the actuator arm where the coil is supported, and then FIGS. 4A, 4B and 4C which show the operating relationship between the rear of the actuator arm and the crash stop.

The crash stops 172, 170 provide a means for stopping the movement of the actuator arm 106 in a gradual fashion without a sudden crashing impact with an inelastic crash stop. The crash stop elements are preferably constructed from a flexible plastic material such as ester-based polyurethane. However, other materials may function just as well. As depicted in the views 2A through 2D, and referring especially to the perspective view of FIG. 2A, the crash stop is comprised of a cantilevered beam 200 connected by a thinner connecting neck 202 to a base support 204. Referring next to the top view of FIG. 2B, the hole 206 through which a screw is inserted is clearly apparent. It may be preferable to insert a sleeve 208 in this hole in the base support (FIG. 2C) in order to further support this hole and be sure that no deflection of the crash stop relative to the base can occur with repeated impacts by the actuator.

The illustration of FIG. 2B is also critical in showing the width of the gap 10 between the cantilevered beam portion 200 and the base support portion 204. This gap is set by wedging the crash stop behind a post schematically represented in FIG. 2B as post 214 which extends up from the base of the base housing casting. This post can be very precisely set, since it is incorporated in the base casting, so that the gap 210 can be set in this case, for example, at 0.009 inch ±0.002 inch by wedging the stop behind the post and tightening the screw 25D (FIG. 4A) to fix the stop in place. By taking this approach, the crash stop incorporates a stepped elasticity which begins to take effect when the rear portion 122 (FIG. 3) and specifically the crest 230 of that rear portion impacts the cantilever element of the crash stop.

Figure 4A:
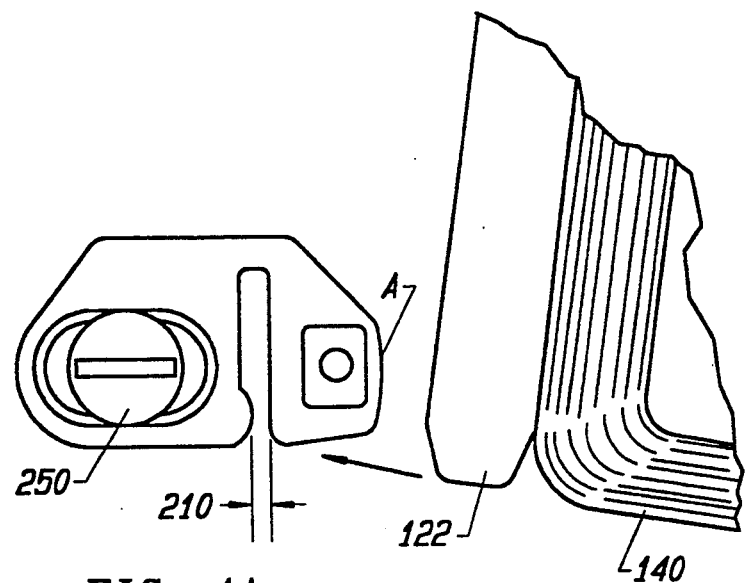
FIGS. 4A, 4B and 4C are top plan views of the limit stop of the present invention showing its cooperative relationship with the motor support of FIG. 3.
Figure 4B:
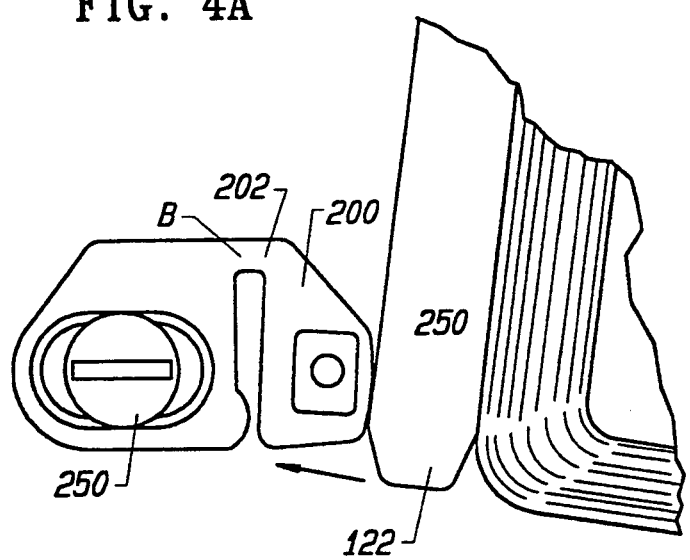
Figure 4C:
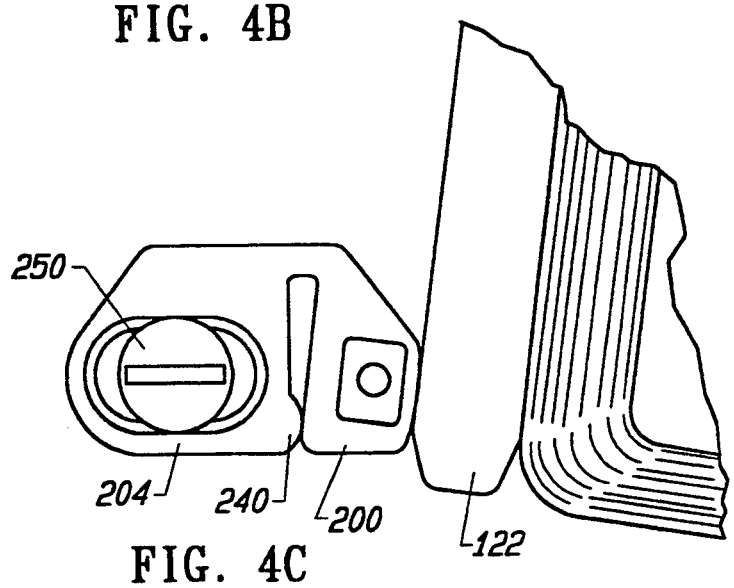

Referring to FIGS. 4A, 4B and 4C, it can be seen that as coil support 122 carrying coil 140 approaches the crash stop 170 the gap is at a preset width. When the coil support arm 122 contacts the cantilever arm 200, the cantilever arm pivots by flexing the connecting neck 202 which, as shown in FIG. 2A, is thinner than the cantilevered portion, thereby slowing the speed of the extended arm. Then, as shown in FIG. 4C, the extended or cantilevered beam 200 contacts the base 204. A protrusion 240 which may be provided either on the base 204, as shown in FIG. 4C, around the cantilevered portion 200, as shown in FIG. 2B, thereby establishing the spring constant to essentially the compressivity of the plastic material and quickly slow the arms motion to a stop. This two-step process reduces the potential harm to the actuator assembly which can result from using a fixed solid crash stop. Typically, subsequent to the final step shown in FIG. 4C, the cantilevered beam with the arm now resting against it returns to the undeformed position shown in FIG. 4A. The gap 210 is established based on a ratio which is defined by the distance from the pivot 128 to the point of contact 250 (FIG. 4B) over the distance from the pivot 128 to the transducer 112 which it is desired to cause to come to rest on landing zone 150. By setting this gap precisely to reflect the design of the balanced actuator arm, the positioning of the head over the landing zone can be very precisely defined so that the loss of data area is minimized.

It should be noted that the preloading of the cantilevered beam is very important, especially if you have a runaway condition where the arm contacts the crash stop at a high speed. The fact that some force is already being applied to the cantilevered beam by virtue of its being preloaded to diminish the relaxed gap width 210 is of significant benefit in rapidly slowing and controlling the impact of the fast-moving arm. The spring constant of the crash stop is primarily controlled by the thickness of the connecting neck or throat portion 202, especially in the region marked "B" on FIG. 4B.

It's also important to note as appears from FIG. 2C and FIGS. 4A, 4B and 4C that, while deflection of the beam portion in response to the striking arm is highly desirable, any deflection in the "Z" axis that is relative to the base would be highly undesirable. It is for this reason that the sleeve 208 is incorporated in the hole in the base region so that the screw 250 which connects the base region to the base of the housing can be tightened down against the steel or aluminum sleeve rather than against the material which forms the base region itself. A potential alternative would be a reinforced plastic liner on the interior of the opening 206 against which the screw head could be tightened.

Finally, it should be apparent that the crash stops at inner and outer range of movement along the path acts are essentially symmetrical.

Figure 3:
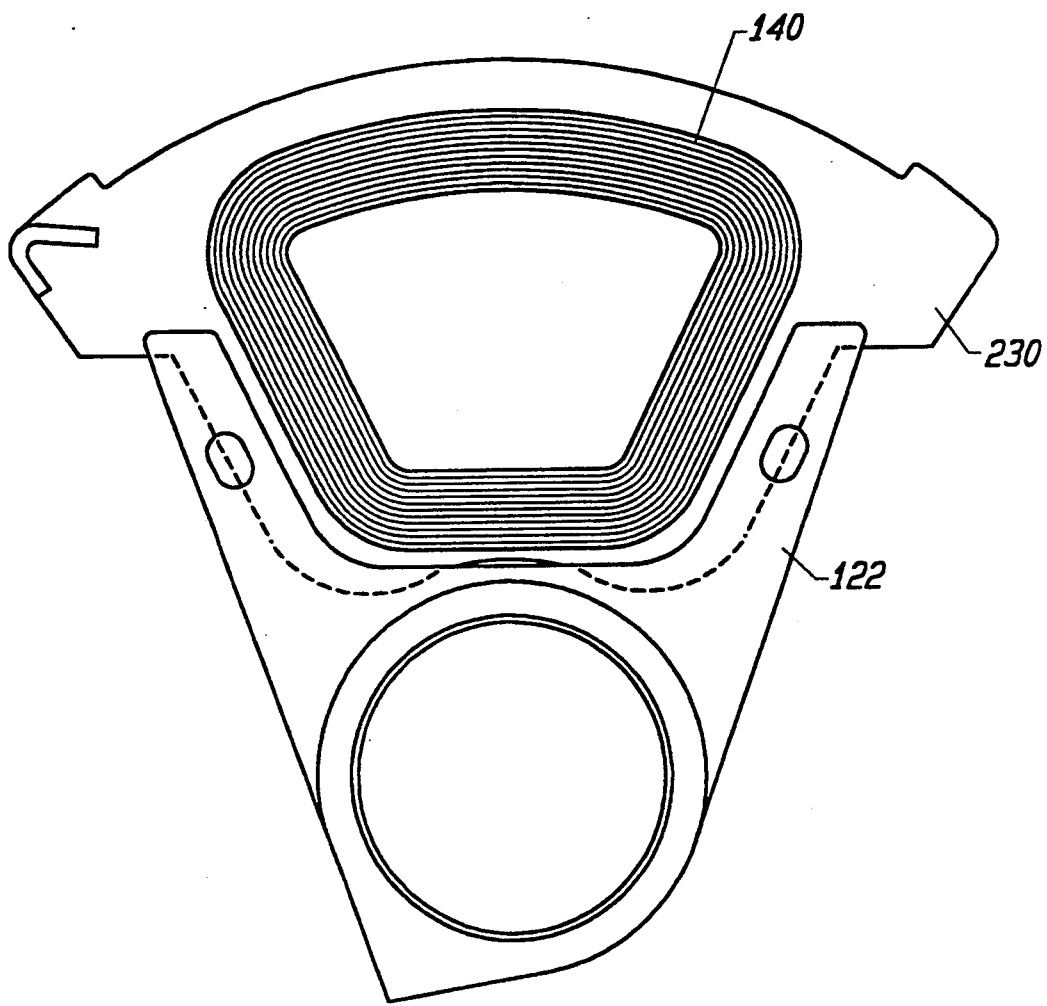
FIG. 3 is a top plan view of motor element support portion of the actuator arm which cooperates with the limit stop of the present invention.

Turning next to FIGS. 2C and 2D, and to the left-hand portion of FIG. 3, a potential modification of the design to incorporate a magnetic latch is described. The cantilevered beam is modified and its width may be slightly extended to define an opening 260. Then a magnet 262 surrounded by two pole pieces, a straight pole piece 264, and a bent pole piece 266, are assembled, inserted in the opening, and fastened in place typically with adhesive, all as shown in FIG. 2D. This magnet 260, 262, 264, 266 cooperates with a ferrous metal striker 270 (FIG. 3) which is incorporated in the rear crest region of the coil support arm 122. As the coil support arm reaches the crash stop, impacts it and is brought to a rest, the gap between the striker 270 and the magnet 260 is closed, and the arm is captured and held in place.

The combination of the magnetic latch and the transducer load upon the disc 100, i.e., approximately 5.0 grams, will reduce the lateral motion of the transducers across the disc surface while the drive is not operating.

Other modifications of the invention may occur to a person of skill in the art who studies this invention disclosure. Therefore, the scope of the invention is to be limited only by the following claims.

What is claimed is:

1. A limit stop in a disc drive system having a movable actuator arm movable on a rotary path, the limit stop comprising:
   a base element for fixing a stop position of the limit stop relative to the actuator arm;
   a cantilevered arm having a first surface facing a first side of said movable actuator arm, said first surface for engaging said first side of said movable actuator arm as said actuator arm rotates to said stop position; and,
   shock mitigation means connecting said base element and said cantilevered arm for slowing or stopping the movement of said movable actuator arm, said cantilevered arm being spaced from said base element by said shock mitigation means to form a first gap, said cantilevered arm movable upon engagement with said first side of said movable actuator arm, said base element stopping the movement of said movable actuator arm when said first gap is closed.

2. A limit stop as claimed in claim 1 wherein said limit stop is formed of polystyrene.

3. A limit stop as claimed in claim 1 wherein said shock mitigation means comprises a flexure connecting said base and said cantilevered arm, said flexure is of narrower cross section than said cantilevered arm in order to provide a flexible connection to establish a spring force for restraining movement of said cantilevered arm.

4. The limit stop of claim 1 wherein said base element includes a first end having a first protrusion on a first surface thereof, said cantilevered arm having a second surface opposing said first end, said second surface adapted to impact said base element at said first protrusion as said cantilevered arm is moved by contact with said movable actuator arm, whereby a defined stopping force is applied to said movable actuator arm.

5. The limit stop of claim 1 wherein said base element includes a first end having a first surface thereof, said cantilevered arm including a second surface opposing said first end having a protrusion on said second surface thereof, said protrusion adapted to impact said base element at said first surface as said cantilevered arm is moved by contact with said movable actuator arm, whereby a defined stopping force is applied to said movable actuator arm.

6. A limit stop as claimed in claim 1 wherein said stop further includes a magnetic latch means incorporated in said cantilevered arm for contacting and holding a rear supporting fork of said actuator arm against said cantilevered arm.

7. A limit stop as defined in claim 6 comprising an aperture defined in said cantilevered arm and a magnet and pole piece incorporated within said opening, and further comprising a ferrous metal striker attached to said actuator arm such that said metal striker interacts with a magnetic field of said magnet to latch via magnetic force attraction to said actuator assembly.

8. A rotary disc storage system comprising:
a disc mounted for rotation within a housing, said housing comprising upper and lower members, said lower member supporting an actuator arm for rotational movement about a fixed pivot point, rotation of said actuator arm positioning a transducer supported at one end thereof over selected data positions on said rotating disc, and an opposite end of said actuator arm supporting a coil for interaction with magnets supported within said housing for selective energization of said coil causing interaction between said coil and said magnets to selectively position said transducer over said disc,
said disc drive further comprising a limit stop mounted adjacent the end of the path of travel of the coil supporting end of said actuator arm, said limit stop comprising;
a base element mounted to a fixed attachment point for fixing a stop position of the limit stop relative to the actuator,
a cantilevered arm having a first surface facing a first side of said actuator arm, said first surface for engaging said first side of said movable actuator arm as said actuator arm rotates to said stop position, and
shock mitigation means connecting said base element and said cantilevered arm for slowing or stopping the movement of said actuator arm, said cantilevered arm being spaced from said base element by said shock mitigation means to form a first gap, said cantilevered arm movable upon engagement with said first side of said movable actuator arm, said base element stopping the movement of said movable actuator arm when said first gap is closed.

9. A limit stop as claimed in claim 8 wherein said limit stop is formed of polystyrene.

10. A limit stop as claimed in claim 8 wherein said shock mitigation means comprises a flexure connecting said base and said cantilevered arm, said flexure is of narrower cross section than said cantilevered arm in order to provide a flexible connection to establish a spring force for restraining movement of said cantilevered arm.

11. The limit stop of claim 8 wherein said base element includes a first end having a first protrusion on a first surface thereof, said cantilevered arm having a second surface opposing said first end, said second surface adapted to impact said base element at said first protrusion as said cantilevered arm is moved by contact with said movable actuator arm, whereby a defined stopping force is applied to said movable actuator arm.

12. The limit stop of claim 8 wherein said base element includes a first end having a first surface thereof, said cantilevered arm including a second surface opposing said first end having a second protrusion on said second surface thereof, said second protrusion adapted to impact said base element at said first surface as said cantilevered arm is moved by contact with said movable actuator arm, whereby a defined stopping force is applied to said movable actuator arm.

13. A limit stop as claimed in claim 8 wherein said stop further includes a magnetic latch means incorporated in said cantilevered arm for contacting and holding a rear supporting fork of said actuator arm against said cantilevered arm.

14. A rotary disc storage system as claimed in claim 8 including means on said housing for fixing the position of said limit stop comprising a first shim pressing against an outer surface of said cantilevered arm opposite said base element of said limit stop, the shim being spaced from said fixed attachment point thereby establishing a defined gap between said cantilevered arm and said base element wherein said connecting shock mitigation means of said limit stop is partially flexed and said gap between said cantilevered arm and said base element is less than said gap when said element is not flexed, whereby a predetermined force counteracting movement of said rotary actuator is defined.

* * * * *